(12) United States Patent
Piwonka

(10) Patent No.: US 7,734,904 B2
(45) Date of Patent: Jun. 8, 2010

(54) RESETTING A SYSTEM IN RESPONSE TO CHANGES OF COMPONENT SETTINGS

(75) Inventor: Mark A. Piwonka, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1795 days.

(21) Appl. No.: 10/423,451

(22) Filed: Apr. 25, 2003

(65) Prior Publication Data

US 2004/0215954 A1 Oct. 28, 2004

(51) Int. Cl.
*G06F 1/24* (2006.01)
*G06F 9/24* (2006.01)
*G06F 15/177* (2006.01)
*G06F 3/00* (2006.01)
*G06F 13/00* (2006.01)
*G06F 12/00* (2006.01)
*G06F 15/00* (2006.01)

(52) U.S. Cl. ............... 713/100; 713/1; 713/2; 709/220; 710/10; 710/104; 711/170; 712/15

(58) Field of Classification Search ............... 713/1, 713/2, 100; 709/220; 710/10, 104; 711/170; 712/15
See application file for complete search history.

(56) References Cited

U.S. PATENT DOCUMENTS

| 5,293,494 A | * | 3/1994 | Saito et al. ............... 713/100 |
| 6,434,696 B1 | | 8/2002 | Kang |
| 2003/0110368 A1 | * | 6/2003 | Kartoz ............... 713/1 |
| 2004/0064686 A1 | * | 4/2004 | Miller et al. ............... 713/1 |

* cited by examiner

*Primary Examiner*—Stefan Stoynov

(57) ABSTRACT

A system includes plural hardware components having settings that can be changed. In response to changing settings of the plural hardware components, a reset of the system is performed. Changing of the settings is performed during a portion of the boot process that is prior to system memory becoming available.

24 Claims, 3 Drawing Sheets

RESETTING A SYSTEM IN RESPONSE TO CHANGES OF COMPONENT SETTINGS

BACKGROUND

Whenever a computer is first started (or rebooted), the computer goes through what is referred to as a boot process. In the boot process, basic input/output system (BIOS) code is executed by a processor in the computer to perform various boot tasks, which include determining if a processor, memory controller, and video interface are set up properly. The BIOS routine determines if the processor and memory controller are operating at proper speeds, and whether the video interface should be set up to handle integrated video memory.

In conventional computers, when a setting of a hardware component, such as the processor, memory controller, or video interface, is changed during the boot process, then a reset of the system is performed in response to each setting change. For example, when the processor speed setting is changed during the boot process, one system reset is performed. If subsequently the memory controller setting is changed, then another reset is performed. Similarly, if the video interface setting is changed, then yet another reset is performed.

One issue associated with performing multiple resets in response to multiple changes in hardware settings is that the boot process takes longer to perform. Currently, one of the goals of the computer industry is to perform the boot process, also referred to as power on self-test (POST), in less than 10 seconds. Performing multiple resets in response to component setting changes may cause the computer not to be able to meet the 10-second goal in some cases.

DETAILED DESCRIPTION

Figure 1:
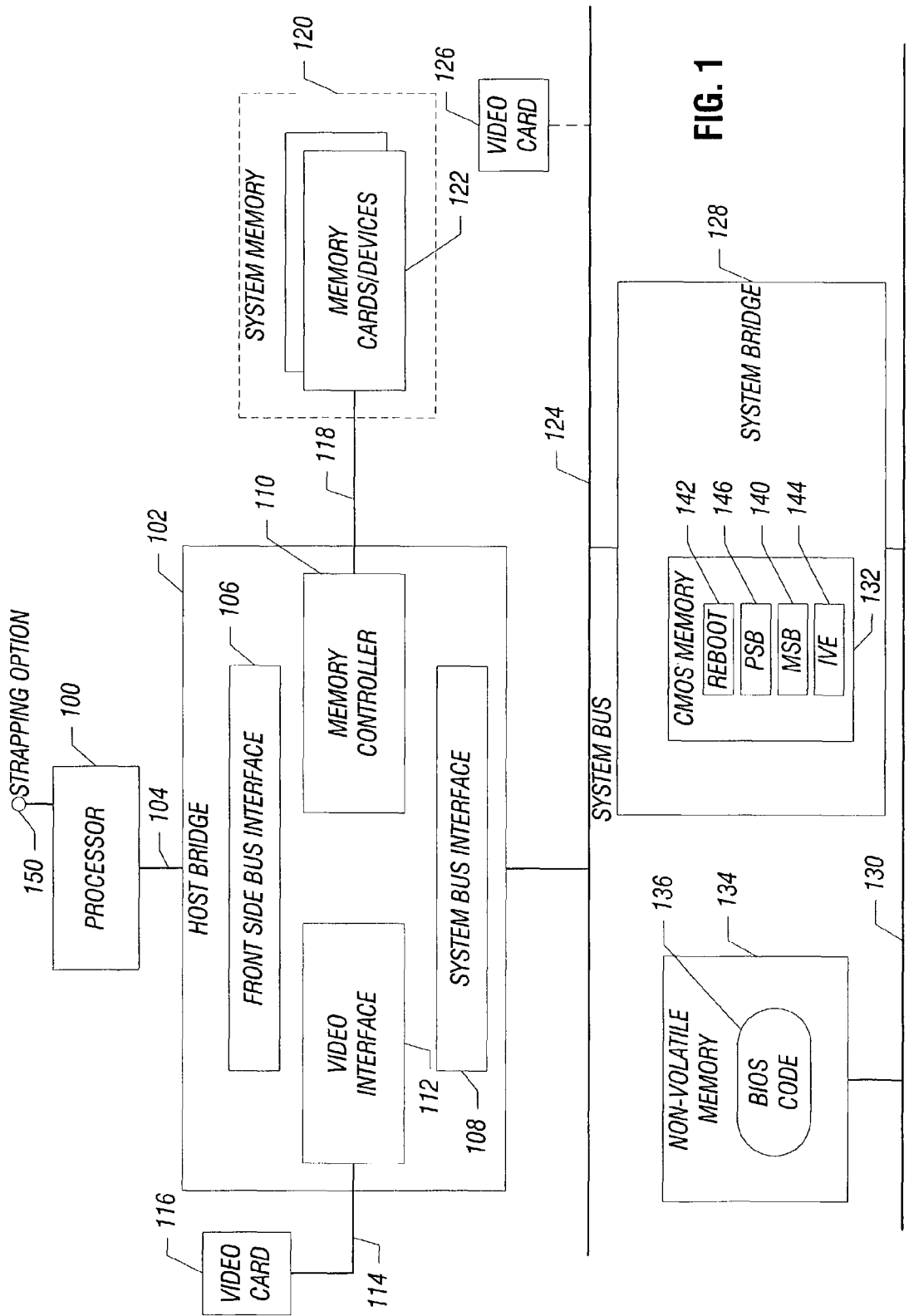
FIG. 1 is a block diagram of an example arrangement of a computer system that incorporates an embodiment of the invention.

FIG. 1 illustrates an example arrangement of a computer system that incorporates an embodiment of the invention. In FIG. 1, a processor 100 is coupled to a host bridge 102 over a front side bus 104. The host bridge 102 includes a front side bus interface 106, a system bus interface 108, a memory controller 110, and a video interface 112. In one example implementation, the video interface 112 is an Accelerated Graphics Port (AGP) interface. In this example implementation, the AGP interface 112 is coupled over an AGP bus 114 to an AGP video card 116. The memory controller 110 is coupled over a memory bus 118 to system memory 120, which includes one or more memory cards/devices 122.

The host bridge 102 is coupled to the system bus 124. In one example implementation, the system bus 124 is a Peripheral Component Interconnect (PCI) bus. Optionally, a video card 126 (e.g., a PCI video card) can be coupled to the system bus 124. In some configurations, the computer system is implemented with an AGP video card 116. In other configurations, the computer system is implemented with a PCI video card 126. In yet other configurations, neither AGP video cards nor PCI video cards are employed—rather, integrated video memory is used in which a portion of system memory 120 is allocated for video memory.

The system bus 124 is further coupled to a system bridge 128, which is in turn coupled to an I/O (input/output) bus 130, such as an Industry Standard Architecture (ISA) bus, a low-pin count (LPC) bus, an extended I/O bus, and so forth. The system bridge 128 includes "CMOS" memory 132, which is non-volatile memory. Typically, the CMOS memory 132 is relatively small and contains information used during the system boot process. Although CMOS memory 132 is shown as being part of the system bridge 128 in the illustrated embodiment, the CMOS memory 132 can be a stand-alone memory or be included in another component in the system.

Also coupled to the I/O bus 130 is another non-volatile memory 134, which can be implemented with flash memory, electrically-erasable programmable read-only memory (EEPROM), and the like. Basic input/output system (BIOS) code 136 is stored in the non-volatile memory 134.

During the boot process, the BIOS code 136 is executed by the processor 100 as a BIOS routine. The BIOS routine performs the boot process, also referred to as power-on self-test (POST). The boot process includes early POST, which is a portion of POST prior to system memory 120 becoming available. During early POST, the system memory 120 is configured in a memory configuration step, after which the system memory 120 becomes available. At that time, the BIOS code 136 is loaded from the non-volatile memory 134 to a portion of system memory 120, and executed by the processor 100.

The processor 100, the memory controller 110 and a video interface 112 each have respective settings that can be changed during the boot process. If a setting is changed, then a reset has to be performed. Performing a reset refers to rebooting the computer system. In accordance with some embodiments of the invention, to reduce the amount of time required to perform the boot process, the number of resets that are performed in response to changes in settings of such components is reduced. For example, in one implementation, the clock speed of the processor 100, the speed of the memory controller 110, and the integrated video memory setting can all be changed during the boot process without performing multiple resets.

Although reference is made to changing of the settings of the processor 100, the memory controller 110, and the video interface 112, it is contemplated that, in other embodiments, settings of other hardware components in addition to or in place of the components listed above can also be performed.

Figure 2A:
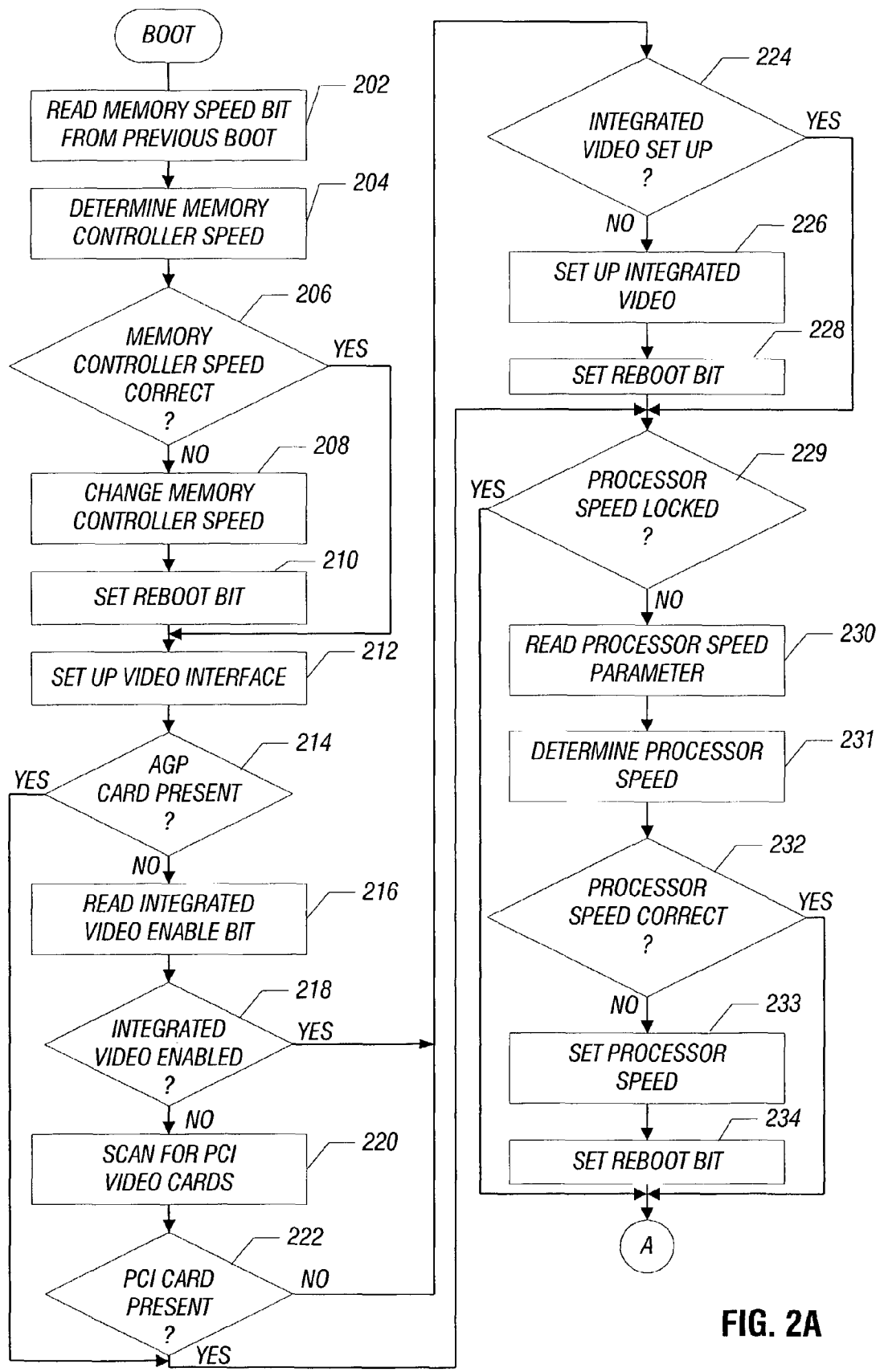
FIGS. 2A-2B is a flow diagram of a boot process in accordance with one embodiment of the invention.
Figure 2B:
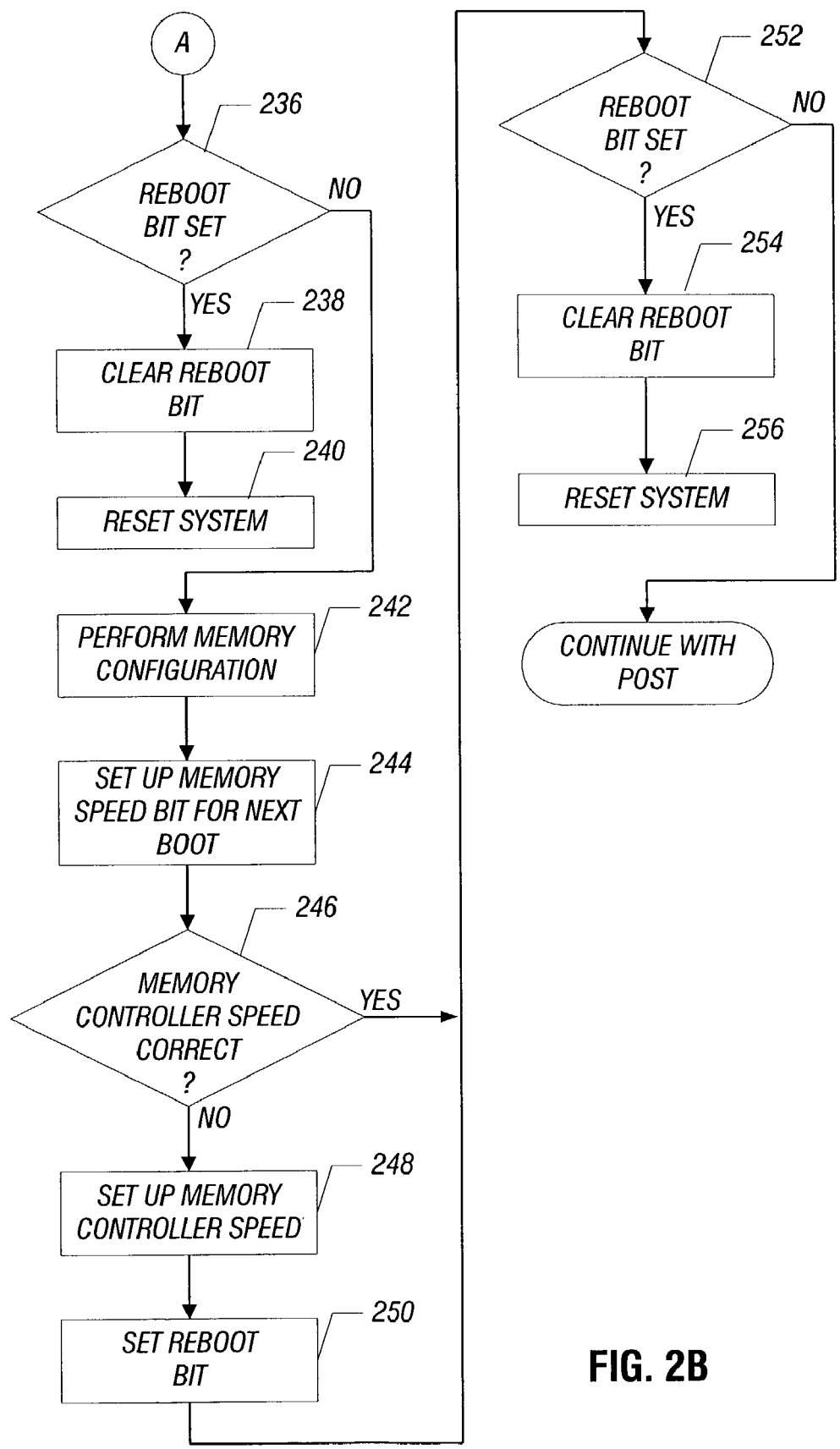

Referring to FIGS. 2A-2B, a portion of a boot process according to some embodiments of the invention is shown. The portion of the boot process shown in FIGS. 2A-2B is early POST (prior to the system memory 120 becoming available).

In response to system start, the BIOS code 136 in the non-volatile memory 134 is executed by the processor 100 as a BIOS routine. Since system memory 120 is not available during early POST, the BIOS code 136 is not loaded into the system memory 120. The BIOS routine reads (at 202) a memory speed bit (MSB) 140 (FIG. 1) from the CMOS memory 132. The memory speed bit 140 indicates the speed at which the memory controller 110 is to interface with the memory cards/devices 122 in the system memory 120. For example, in one implementation, the memory cards/devices 122 may operate at either 266 megahertz (MHz) or 200 MHz. The memory speed bit is used to indicate one of the two speeds that the memory card/devices 122 are capable of operating at, and thus, the memory controller 110 is set accordingly. In other embodiments, instead of a single bit to represent the memory controller speed, a multi-bit parameter stored in CMOS memory 132 can be used to represent more than two speeds.

The BIOS routine next determines (at 204) the operating speed of the memory controller 110, which in one implementation is performed by reading a register value in the host bridge 102. The register value may be stored in configuration registers of the host bridge 102 that are associated with the memory controller 110.

The operating speed setting of the memory controller 110 is then compared (at 206) to the speed indicated by the memory speed bit 140. If the speed of the memory controller 110 is not correct based on this comparison, then the speed of the memory controller 110 is changed (at 208). Since the setting of the memory controller 110 has been changed, the BIOS routine sets (at 210) a CMOS reboot bit 142 (FIG. 1) in the CMOS memory 132. This is an indication to the system that at some point, a reset is to be performed to change the setting of a hardware component. However, in accordance with some embodiments of the invention, the system does not reboot immediately since settings of other components may have to be changed. To improve efficiency, the reset is performed all at one time to avoid as much as possible the performance of multiple resets in response to multiple setting changes that can extend POST execution.

Next, the video interface 112 and other video-related hardware settings of the computer system are set up (at 212). An example of setting up the video hardware includes setting up bus numbers and other like settings in the host bridge 102.

Next, the BIOS routine determines (at 214) if the AGP video card 116 is present. If so, then the BIOS routine bypasses acts 216-228. However, if the AGP video card 116 is not present, then the BIOS routine reads (at 216) a CMOS integrated video enable (IVE) bit 144 (FIG. 1) in the CMOS memory 132. Integrated video refers to using a portion of system memory 120 for use as a video buffer to store video data. This is contrasted to using separate video memory that resides either on the AGP video card 116 or the PCI video card 126. Again, instead of using a single bit to indicate whether integrated video is enabled, a multi-bit parameter can be used.

The BIOS routine determines (at 218) if integrated video is enabled (based on the state of the CMOS integrated video enable bit 144). If integrated video is enabled, then the BIOS routine determines if integrated video has been set up (at 224) in the computer system. This can be based on the content of a configuration register associated with the video interface 112 in the host bridge 102. If integrated video has already been set up, as determined at 224, then the setting of the host bridge 102 for integrated video does not need to be changed, so that a reset does not have to be performed (in other words, acts 226 and 228 are bypassed). However, if integrated video has not been set up, then the BIOS routine sets up integrated video (at 226) in the host bridge 102 by programming appropriate values into configuration registers for the video interface 112. Next, since the setting of the video interface 112 has been changed, the CMOS reboot bit 142 is set (at 228) to indicate that a subsequent reset is to be performed. Again, instead of performing the reset immediately, the BIOS routine waits to determine if additional hardware setting changes are needed prior to performing the reset.

If the BIOS routine determines at 218 that integrated video does not need to be enabled, then the BIOS routine scans (at 220) for the PCI video card 126. This can be performed by scanning configuration registers on the PCI bus or some other component to determine if the PCI video card 126 resides on the system bus 124. The BIOS routine then determines (at 222) if the PCI video card is present. If so, then video memory is available on the PCI video card and thus integrated video does not need to be set up. As a result, the BIOS routine can proceed to the next task. However, if the PCI video card 126 is not present, as determined at 222, then the BIOS routine determines (at 224) if integrated video has been set up. If not, then integrated video is set up (at 226) and the CMOS reboot bit is set (at 228). Without the presence of the AGP video card 116 or the PCI video card 126, a portion of system memory 120 is used as video memory.

The BIOS routine next determines (at 229) if the processor 100 speed is locked, such as by using a strapping option 150 (FIG. 1) to strap one or more input pins of the processor 100 to a particular state (high or low) to fix an operating speed of the processor 100. If the speed of the processor 100 is locked, then the speed setting of the processor 100 cannot be changed and acts 230-234 are bypassed. However, if the speed of the processor is not locked, then the BIOS routine reads (at 230) the processor speed bits 146 (FIG. 1) in the CMOS memory 132. Next, the BIOS routine determines (at 231) the operating speed of the processor 100, such as by reading an internal register value of the processor 100. The BIOS routine then determines (at 232) if the operating speed of the processor 100 is correct, based on a comparison of the operating speed of the processor 100 and the value of the processor speed bits 146. If the operating speed of the processor 100 is not correct, then the operating speed of the processor 100 is changed (at 233). Since the setting of the processor 100 has been changed, the CMOS reboot bit 142 is set (at 234), to indicate that a subsequent reset is to be performed.

The BIOS routine then determines (at 236) if the CMOS reboot bit is set. If so, then the CMOS reboot bit is cleared (at 238) and the BIOS routine causes system reset to be performed (at 240). However, if the CMOS reboot bit is not set, then the BIOS routine continues and later performs (at 242) memory configuration. The BIOS routine sets (at 244) the state of the CMOS memory speed bit 140 for the next boot based on the capability of the memory cards/devices 122 (FIG. 1). Generally, each memory card/device 122 includes a non-volatile memory that contains information pertaining to operating capabilities of the memory card/device. From this information, the BIOS routine can determine the operating speed (or maximum operating speed) of each memory card/device. Based on the determined operating speed of the memory card/device, the state of the memory speed bit 140 is set accordingly (at 244).

The BIOS routine then compares (at 246) the operating speed of the memory controller 110 with respect to the operating speed capability of the memory card/device (derived from reading the status information in the non-volatile memory of all the memory cards/devices). If the memory speed of the memory controller 110 is not correct, then the appropriate memory speed setting is set (at 248) in the memory controller 110. The memory cards/devices 122 may have been replaced since the last boot, which may cause the speed setting of the memory 120 to change. In this case, another reboot is to be performed. Thus, when memory is physically changed, it may be possible that two resets are performed on the next boot. However, in other cases, only one boot is performed in response to multiple hardware setting changes. Because the memory controller speed setting was changed at 248, the CMOS reboot bit 142 is set (at 250) to perform a subsequent reset.

Next, the BIOS routine determines (at 252) if the reboot bit has been set. If so, the CMOS reboot bit 142 is cleared (at 254) and the BIOS routine causes a reset of the system (at 256).

Instructions of the various software routines or modules discussed herein (such as the BIOS routine) are loaded for execution on a control unit or processor. The control unit or processor includes microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored in one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to the system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a system having a system memory, comprising:
    performing a boot process;
    during the boot process, changing settings of plural different types of hardware components, wherein changing the settings is performed during a portion of the boot process prior to the system memory becoming available; and
    in response to changing the settings of the plural different types of hardware components, performing a reset of the system.

2. The method of claim 1, further comprising setting an indicator to indicate that reset of the system is to be performed, wherein setting the indicator is performed in response to changing the settings of the plural types of hardware components.

3. The method of claim 1, wherein setting the indicator comprises setting the indicator stored in a non-volatile memory.

4. The method of claim 3, wherein setting the indicator stored in the non-volatile memory comprises setting the indicator in CMOS memory.

5. The method of claim 1, further comprising performing memory configuration to configure the system memory, wherein changing the settings is performed prior to the memory configuration.

6. The method of claim 1, wherein changing the settings of the plural types of hardware components comprises changing the settings of at least two of a video interface, a memory controller, and a processor, and wherein performing the reset is in response to changing the settings of the at least two of the video interface, the memory controller, and the processor.

7. The method of claim 6, wherein changing the setting of the memory controller comprises changing an operating speed setting of the memory controller, wherein changing the setting of the processor comprises changing an operating speed setting of the processor, and changing the setting of the video interface comprises changing an indication of whether integrated video memory is employed, and
    wherein performing the reset is in response to at least two of changing the operating speed setting of the memory controller, changing the operating speed setting of the processor, and changing the indication of whether integrated video memory is employed.

8. The method of claim 1, wherein performing the boot process and changing the settings are performed by a basic input/output system (BIOS) routine.

9. The method of claim 1, wherein performing the reset in response to changing the settings of the plural types of hardware components comprises performing a single reset in response to changing the settings of the plural types of hardware components.

10. An article comprising at least one storage medium containing instructions that when executed cause a system having a system memory to:
    perform a boot process;
    during the boot process, change settings of at least two of a memory controller, a processor, and a video interface, wherein changing the settings is performed during a portion of the boot process prior to the system memory becoming available; and
    in response to changing the settings of at least two of the memory controller, the processor, and the video interface, set an indicator to cause a single reset of the system.

11. The article of claim 10, wherein the instructions when executed cause the system to reboot the system in response to the indicator being set, wherein rebooting of the system occurs after the settings of at least two of the memory controller, the processor, and the video interface have been changed.

12. The article of claim 10, wherein setting the indicator comprises setting the indicator stored in a non-volatile memory.

13. The article of claim 12, wherein setting the indicator stored in the non-volatile memory comprises setting the indicator in CMOS memory.

14. The article of claim 10, wherein the instructions when executed cause the system to perform memory configuration to configure the system memory, wherein changing the settings of at least two of the memory controller, the processor, and the video interface is performed prior to the memory configuration.

15. The article of claim 14, wherein the instructions when executed cause the system to further:
    reboot the system in response to the indicator being set, wherein rebooting of the system occurs after the settings of at least two of the memory controller, the processor, and the video interface have been changed and prior to the memory configuration.

16. The article of claim 10, wherein changing the setting of the memory controller comprises changing an operating speed setting of the memory controller, wherein changing the setting of the processor comprises changing an operating speed setting of the processor, and changing the setting of the video interface comprises changing an indication of whether integrated video memory is employed, and wherein setting the indicator to cause the single reset is in response to at least two of changing the operating speed setting of the memory controller, changing the operating speed setting of the processor, and changing the indication of whether integrated video memory is employed.

17. The article of claim 10, wherein performing the boot process and changing the settings are performed by a basic input/output system (BIOS) routine.

18. The article of claim 10, wherein the indicator is an indicator that reset of the system is to be performed.

19. A system comprising:
a system memory;
plural different types of hardware components; and
a routine to cause performance of one reset of the system in response to changing of settings of the plural different types of hardware components, wherein changing the settings is performed during a portion of the boot process prior to the system memory becoming available.

20. The system of claim 19, wherein the routine is to further set an indicator to indicate that reset of the system is to be performed, wherein the indicator is set in response to changing the settings of the plural types of hardware components.

21. The system of claim 20, further comprising a CMOS memory having the indicator.

22. The system of claim 19, wherein the routine is to further perform memory configuration to configure the system memory after changing the settings.

23. The system of claim 19, wherein changing the settings of the plural hardware components comprises changing the settings of at least two of a video interface, a memory controller, and a processor, and wherein the routine causes performance of the one reset in response to changing of the settings of at least two of the video interface, the memory controller, and the processor.

24. The system of claim 23, wherein changing the setting of the memory controller comprises changing an operating speed setting of the memory controller, wherein changing the setting of the processor comprises changing an operating speed setting of the processor, and changing the setting of the video interface comprises changing an indication of whether integrated video memory is employed, and wherein the routine causes performance of the one reset in response to at least two of changing the setting of the operating speed setting of the memory controller, changing the operating speed setting of the processor, and changing the indication of whether integrated video memory is employed.

* * * * *